US009069609B2

(12) United States Patent
Abdalla et al.

(10) Patent No.: US 9,069,609 B2
(45) Date of Patent: Jun. 30, 2015

(54) SCHEDULING AND EXECUTION OF COMPUTE TASKS

(75) Inventors: Karim M. Abdalla, Menlo Park, CA (US); Lacky V. Shah, Los Altos Hills, CA (US); Jerome F. Duluk, Jr., Palo Alto, CA (US); Timothy John Purcell, Provo, UT (US); Tanmoy Mandal, San Jose, CA (US); Gentaro Hirota, Sunnyvale, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 613 days.

(21) Appl. No.: 13/353,150

(22) Filed: Jan. 18, 2012

(65) Prior Publication Data

US 2013/0185728 A1    Jul. 18, 2013

(51) Int. Cl.
*G06F 9/46* (2006.01)
*G06F 9/48* (2006.01)
*G06F 9/50* (2006.01)

(52) U.S. Cl.
CPC .............. *G06F 9/4881* (2013.01); *G06F 9/50* (2013.01); *G06F 9/4806* (2013.01); *G06F 2209/483* (2013.01)

(58) Field of Classification Search
None
See application file for complete search history.

(56) References Cited

U.S. PATENT DOCUMENTS

| | | | |
|---|---|---|---|
| 6,006,249 A * | 12/1999 | Leong | 718/107 |
| 6,748,453 B2 * | 6/2004 | Law et al. | 719/314 |
| 7,051,330 B1 * | 5/2006 | Kaler et al. | 718/106 |
| 7,461,376 B2 | 12/2008 | Geye et al. | |
| 8,266,258 B1 * | 9/2012 | Cortes et al. | 709/220 |
| 8,661,435 B2 * | 2/2014 | Schroth et al. | 718/1 |
| 8,738,880 B2 * | 5/2014 | Grusy et al. | 711/170 |
| 2002/0065953 A1 * | 5/2002 | Alford et al. | 709/328 |
| 2010/0199288 A1 * | 8/2010 | Kalman | 718/102 |
| 2011/0161979 A1 | 6/2011 | Flemming et al. | |
| 2011/0276978 A1 * | 11/2011 | Gaiarsa et al. | 718/104 |
| 2012/0284725 A1 * | 11/2012 | Zwaal | 718/102 |
| 2013/0117758 A1 * | 5/2013 | Cuadra et al. | 718/104 |
| 2013/0152093 A1 * | 6/2013 | Duncan et al. | 718/102 |
| 2013/0290971 A1 * | 10/2013 | Chen et al. | 718/102 |

FOREIGN PATENT DOCUMENTS

TW     200947302 A     11/2009

OTHER PUBLICATIONS

Lindholm, et al., "Nvidia Tesla: A Unified Graphics and Computing Architecture", IEEE Computer Society, 2008, pp. 39-55.

* cited by examiner

*Primary Examiner* — Kenneth Tang
(74) *Attorney, Agent, or Firm* — Artegis Law Group, LLP

(57) ABSTRACT

One embodiment of the present invention sets forth a technique for assigning a compute task to a first processor included in a plurality of processors. The technique involves analyzing each compute task in a plurality of compute tasks to identify one or more compute tasks that are eligible for assignment to the first processor, where each compute task is listed in a first table and is associated with a priority value and an allocation order that indicates relative time at which the compute task was added to the first table. The technique further involves selecting a first task compute from the identified one or more compute tasks based on at least one of the priority value and the allocation order, and assigning the first compute task to the first processor for execution.

22 Claims, 8 Drawing Sheets

SCHEDULING AND EXECUTION OF COMPUTE TASKS

BACKGROUND OF THE INVENTION

1. Field of the Invention

The present invention generally relates to compute tasks and more specifically to scheduling and execution of compute tasks.

2. Description of the Related Art

Conventional scheduling of compute tasks for execution in multiple processor systems relies on an application program or driver. During execution of the compute tasks, interaction between the driver and multiple processors that is needed to allow the driver to schedule the compute tasks may delay execution of the compute tasks.

Accordingly, what is needed in the art is a system and method for dynamically scheduling compute tasks for execution based on the processing resources and priorities of the available compute tasks. Importantly, the scheduling mechanism should not depend on or require software or driver interaction.

SUMMARY OF THE INVENTION

One embodiment of the present invention sets forth a method for assigning a compute task to a first processor included in a plurality of processors. The method involves analyzing each compute task in a plurality of compute tasks to identify one or more compute tasks that are eligible for assignment to the first processor, where each compute task is listed in a first table and is associated with a priority value and an allocation order that indicates a time at which the compute task was added to the first table. The technique further involves selecting a first compute task from the identified one or more compute tasks based on at least one of the priority value and the allocation order, and assigning the first compute task to the first processor for execution.

Further embodiments provide a non-transitory computer-readable medium and a computer system to carry out the method set forth above.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
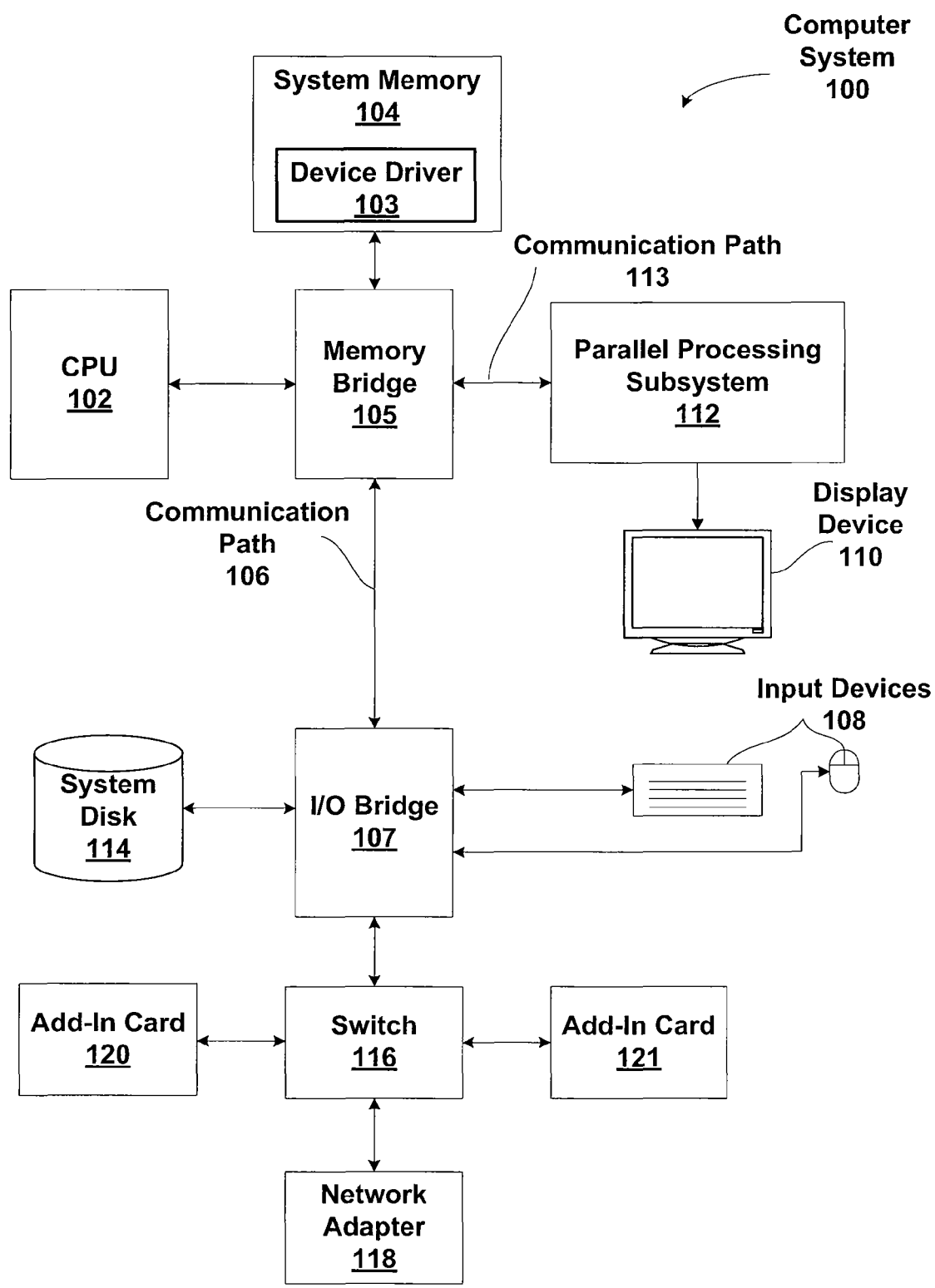
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
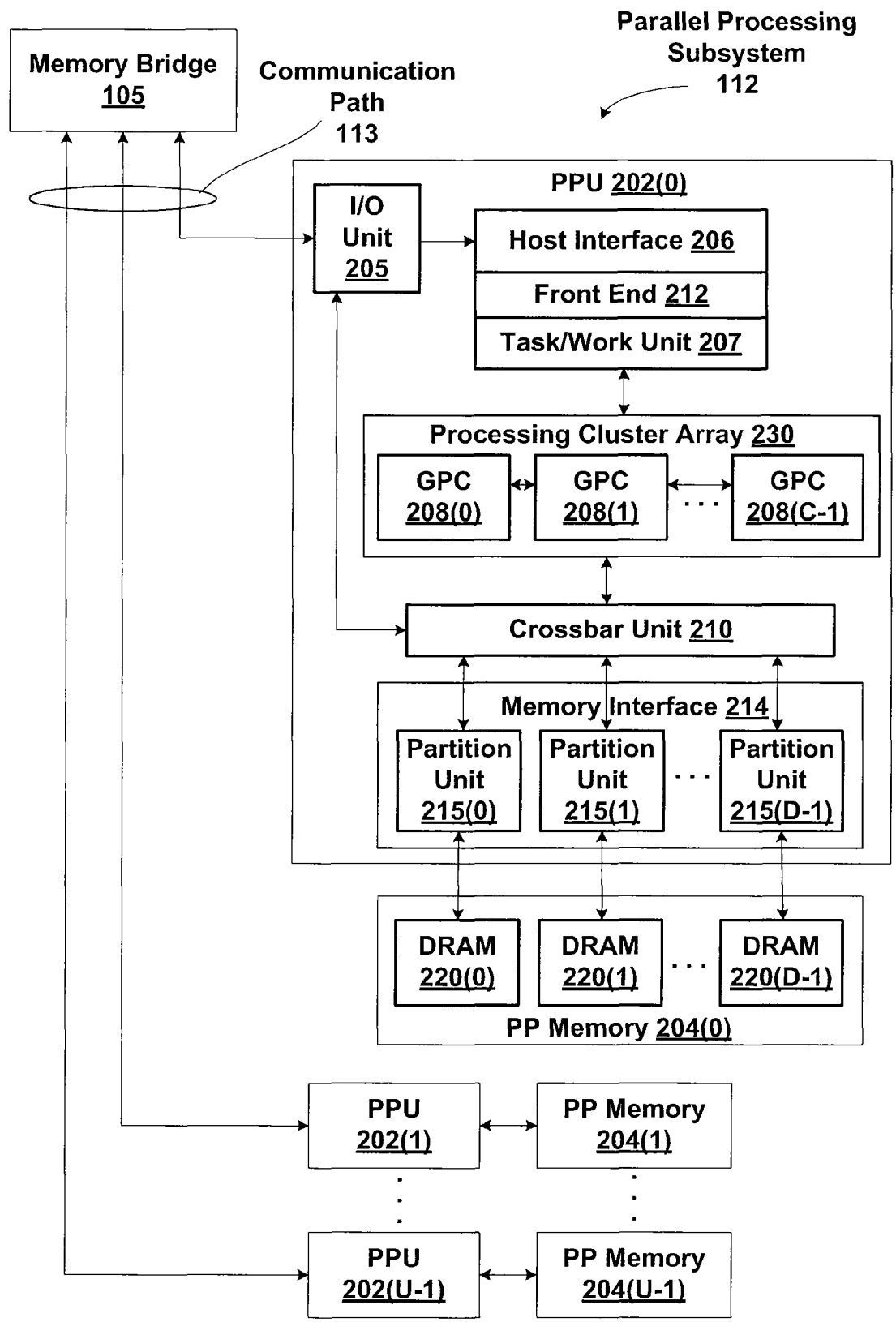
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs may include indices within an array of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
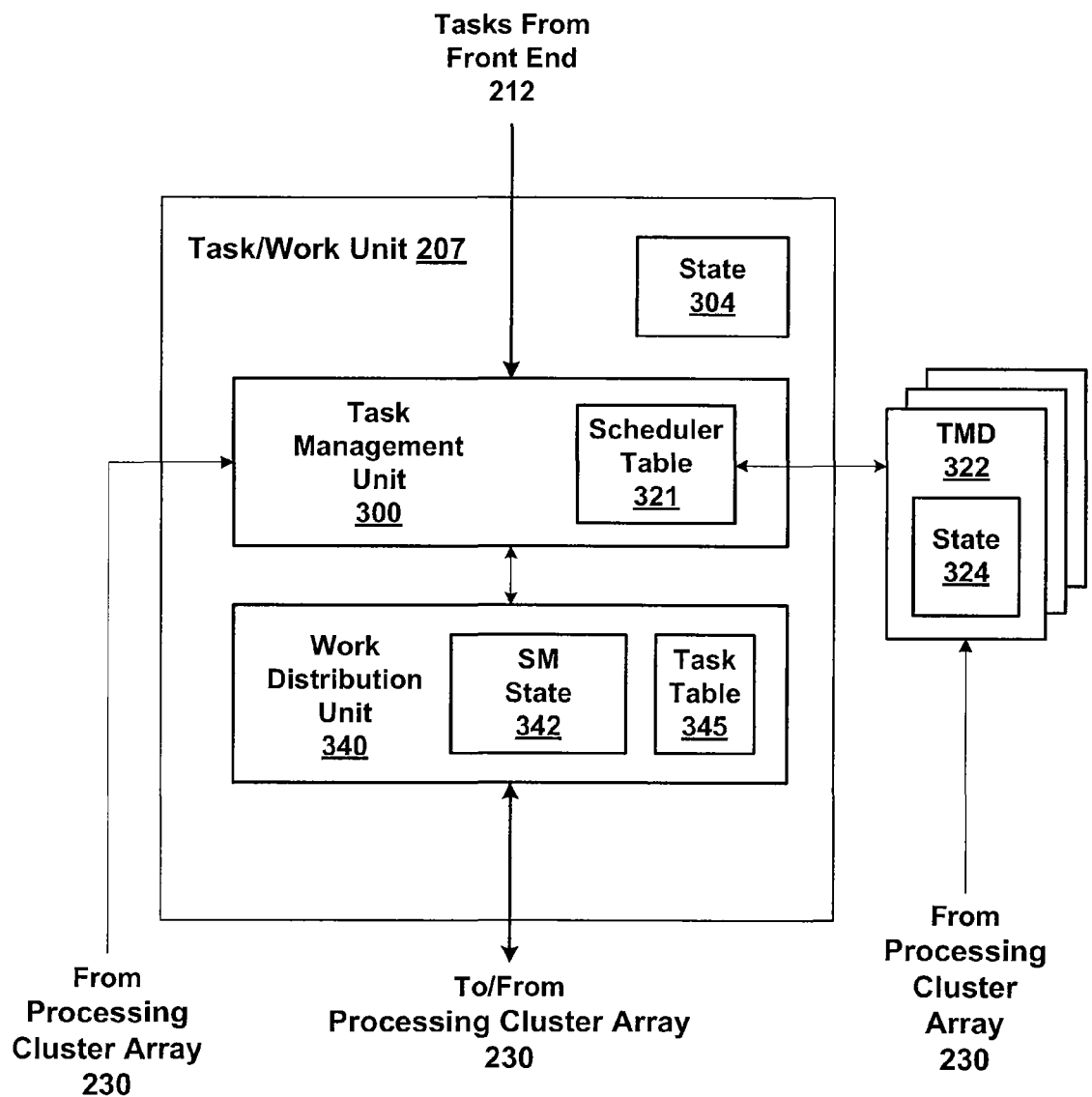
FIG. 3A is a block diagram of the Task/Work Unit of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340, and state 304 (the contents of which are described in detail below in conjunction with FIGS. 4A-4B). The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. Each TMD 322 includes state 324 that is relevant to the way the TMD 322 is handled within the PPU 202, as described in further detail herein.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. In some embodiments, the place to resume the task is stored in the task's TMD 322. When a child processing task is generated, during execution of a task, a pointer to the child task is added to the list of task pointers to be scheduled. A child task may be generated by a TMD 322 executing in the processing cluster array 230. The work distribution unit 340 also includes streaming multiprocessor (SM) state 342, which stores state data for each SM 310 included in PPU 202, as described in further detail herein.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
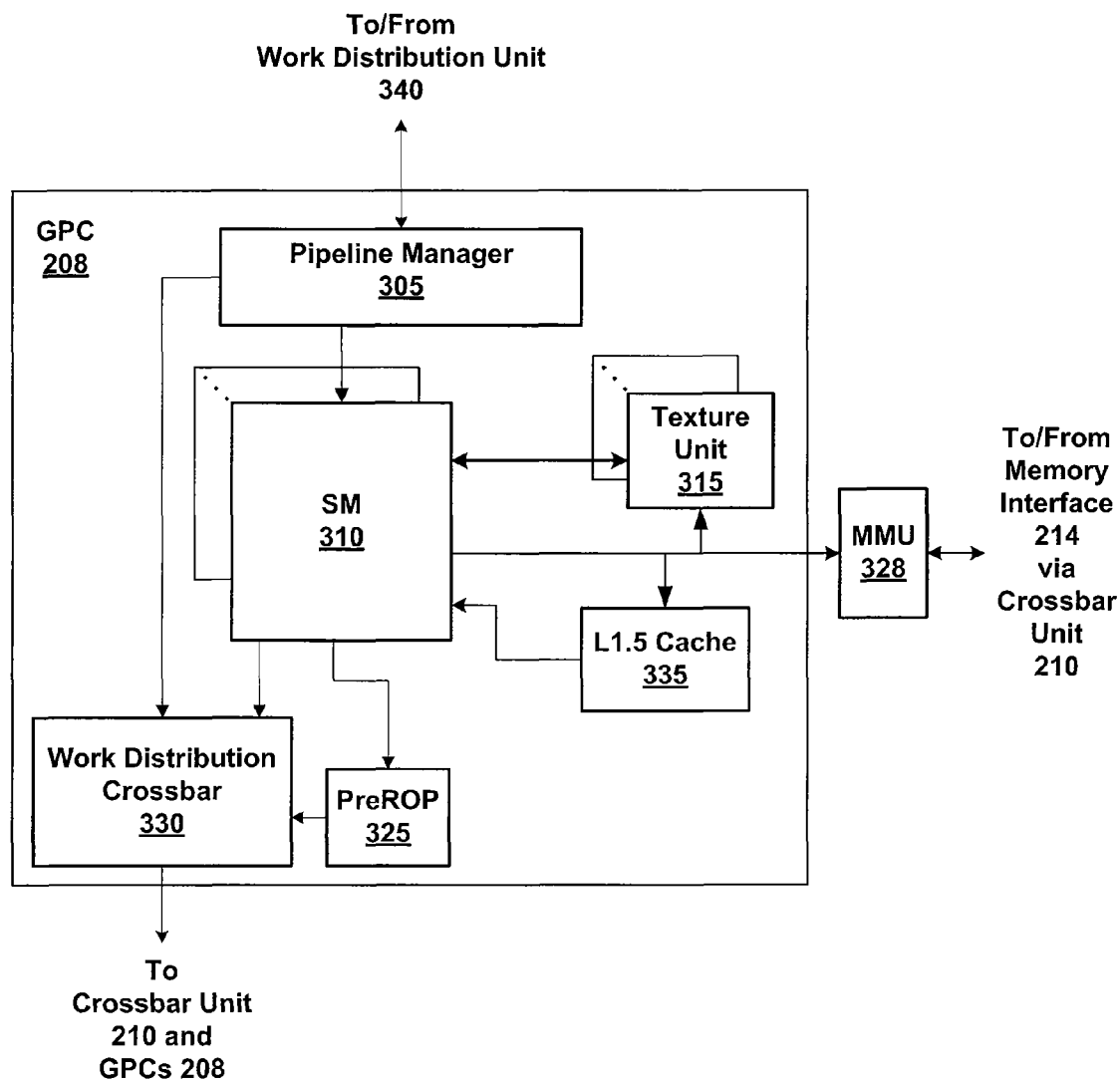
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of a thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
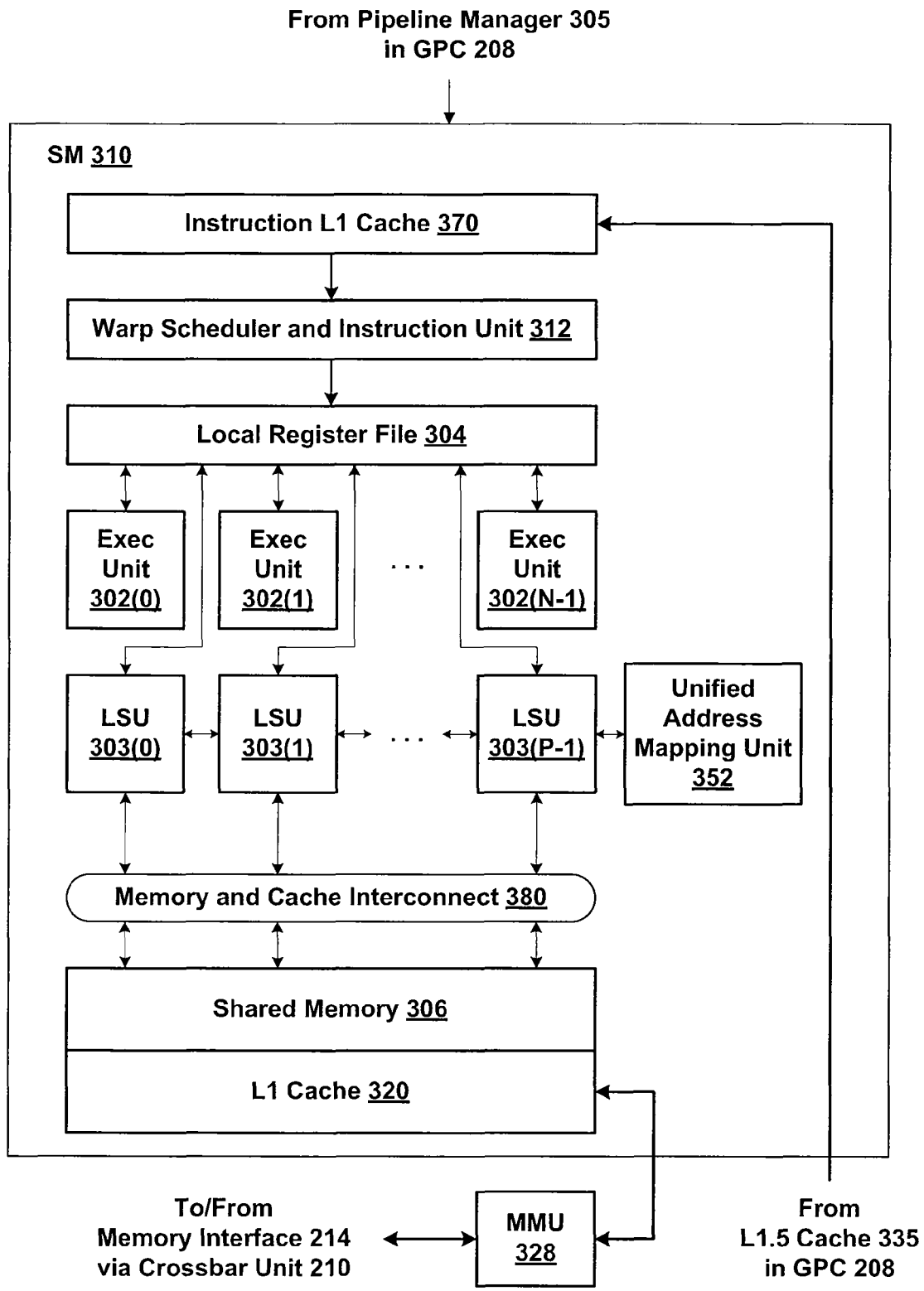
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. In some embodiments, threads or CTAs that are suspended save their program state, write data to a queue TMD that represents a continuation of the thread or CTA, and then exit, so as to allow other threads or CTAs to run. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) bound to the task stores runtime parameters (constants) that can be read but not written by any thread of that task (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Scheduling and Execution of Compute Tasks

Figure 4A:
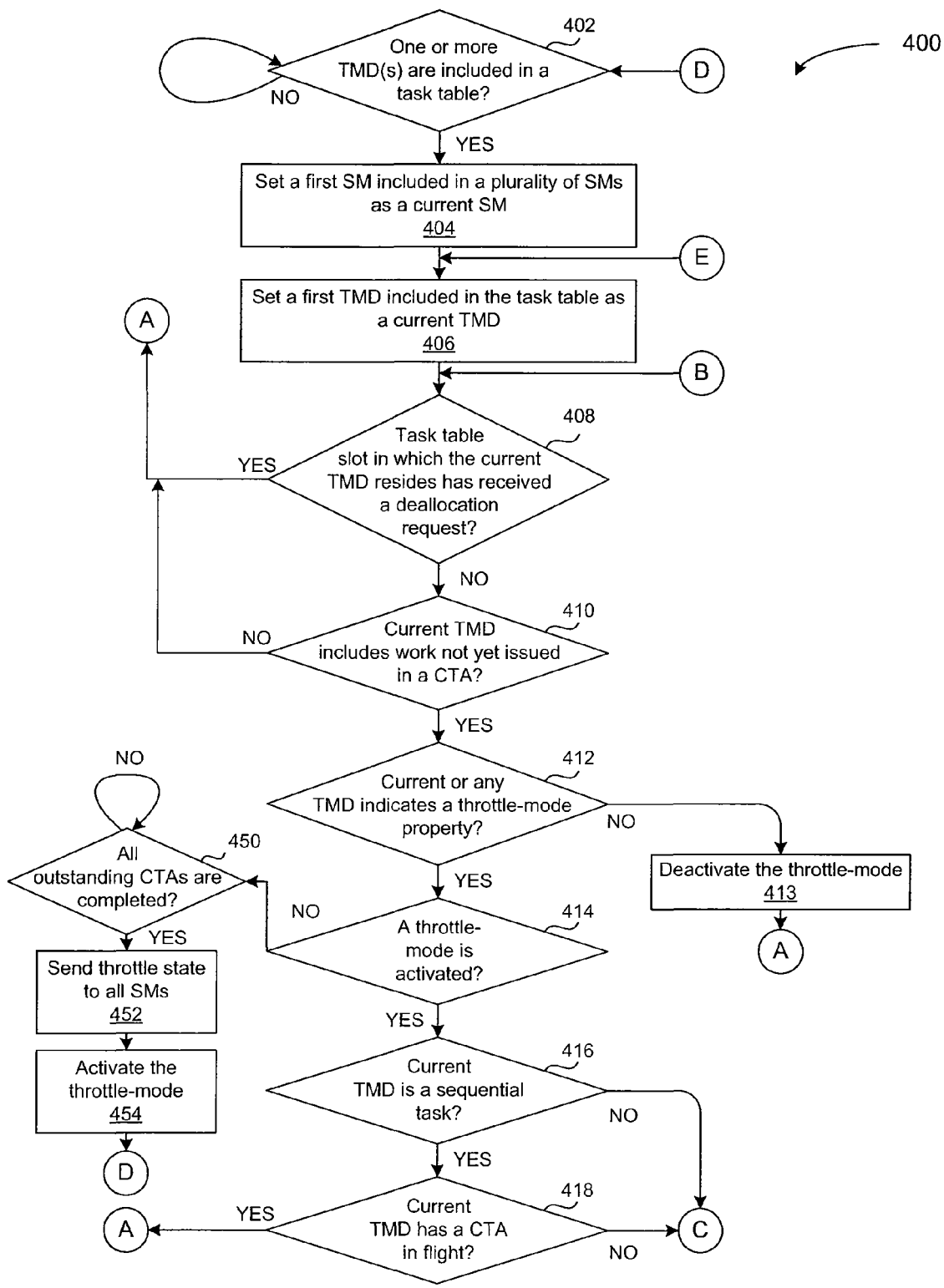
FIGS. 4A-4B illustrate a method for assigning tasks to streaming multiprocessors (SMs) of FIGS. 3A-3C, according to one embodiment of the invention.
Figure 4B:
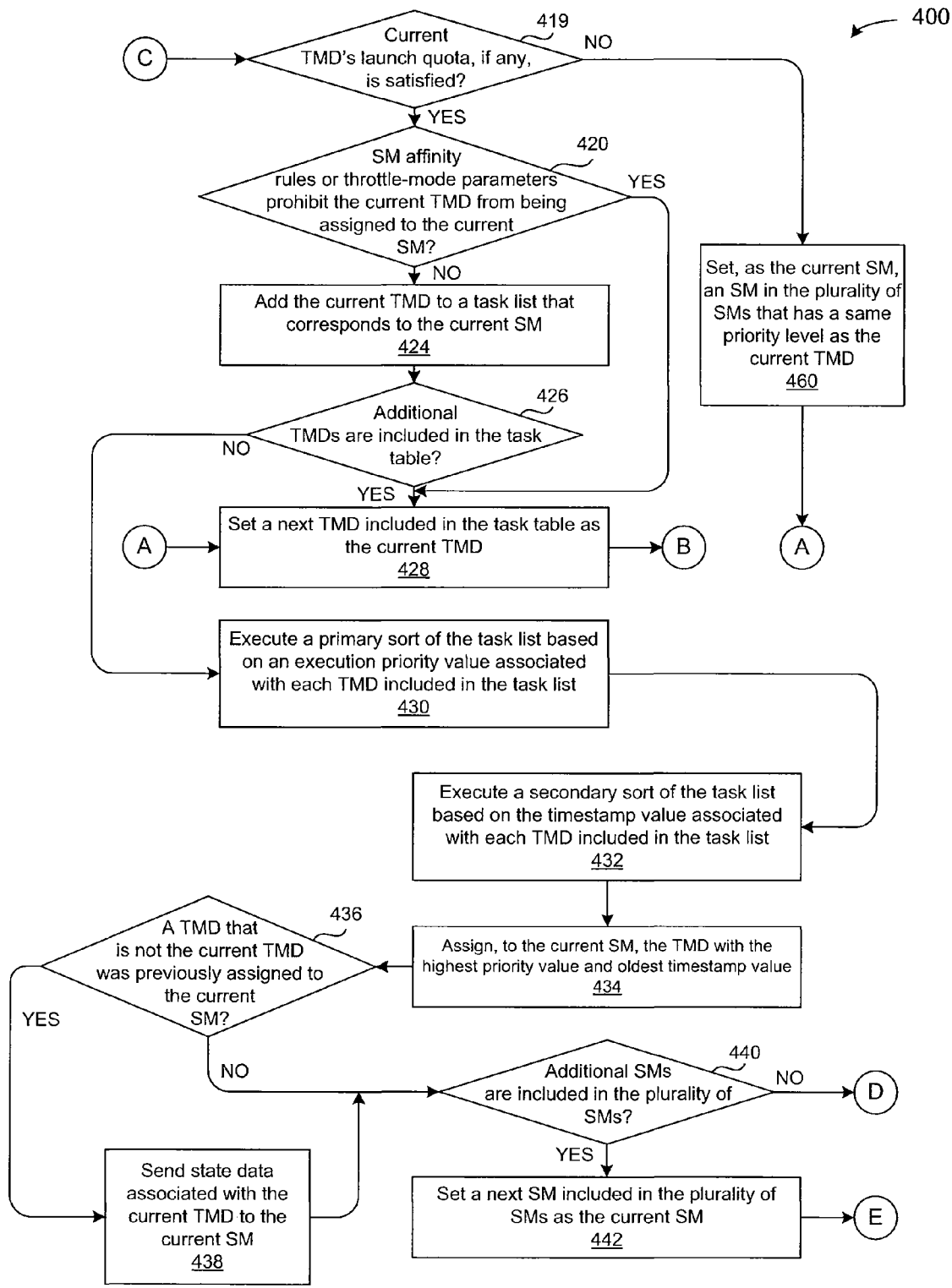

FIGS. 4A-4B illustrate a method 400 for assigning tasks to SMs 310 of FIGS. 3A-3C, according to one embodiment of the invention. Although the method steps are described in conjunction with the systems of FIGS. 1-3C, persons skilled in the art will understand that any system configured to perform the method steps, in any order, is within the scope of the inventions.

As shown, the method 400 begins at step 402, where the WDU 340 determines whether one or more TMD(s) 322 are included in the task table 345 of FIG. 3A. At step 404, the WDU 340 sets a first SM included in a plurality of SMs (e.g., the SMs 310 included within PPU 202) as a current SM. At step 406, the WDU 340 sets a first TMD 322 included in the task table 345 as a current TMD.

At step 408, the WDU 340 determines whether the task table 345 slot in which the current TMD resides has received a deallocation request. If, at step 408, the WDU 340 determines that the task table slot in which the current TMD resides has received a deallocation request, then the current TMD should not be any SM 310. Accordingly, the method 400 proceeds to step 428, where the WDU 340 sets a next TMD 322 included in the task table 345 as the current TMD. In turn, the method 400 proceeds back to step 408 described above.

Conversely, if the WDU 340 at step 408 determines that the task table slot in which the current TMD resides has not received a deallocation request, then the method 400 proceeds to step 410.

At step 410, the WDU 340 determines whether the current TMD includes work not yet issued in a CTA. If, at step 410, the WDU 340 determines that the current TMD does not include work not yet issued in a CTA, then the method 400 proceeds to step 428 described above. Otherwise, the method 400 proceeds to step 412.

In one embodiment, each TMD 322 is comprised of quasi-static state that is set by, for example, task management unit 300 and work distribution unit 340 when the TMD 322 is being scheduled for execution. Each TMD 322 is also comprised of dynamic state that is updated as the TMD 322 is executed, e.g., as CTA launches and completions for the TMD 322 occur.

There are many components of state included in the TMD 322 that are relevant to the way the TMD 322 is handled within the PPU 202. In one embodiment, the TMD 322 includes state for tracking the number of work items included in the TMD 322 that have not been completed. In some cases, the TMD 322 may also include state that specifies a minimum number of work items that are required to be included in each CTA issued to an SM 310 (referred to hereinafter as "coalescing rules"), along with state that specifies a threshold amount of time allowed to wait to accumulate the minimum required number of work items before ultimately launching a CTA for execution (referred to hereinafter as "coalescing timeout"). When a TMD specifies M work items per CTA, then N items are read by each CTA. For example, there could be a plurality of TMDs writing work items to the queue TMD, where each CTA of the queue TMD processes N work items. This "coalesces" the N separate work items into one CTA. However, the plurality of TMDs might not generate a number of work items that is divisible by N, which results in a partial set of work items that are left outstanding. To circumvent the foregoing, in one embodiment, the TMD includes a timeout value that allows a CTA to be launched with M work items, where M<N. The value of M is taken as an input to the CTA, and instructions associated with the CTA are written to process either M or N work items, dependent on the value of M.

The TMD 322 also includes state that specifies an execution priority level of the TMD 322, e.g., a priority level that ranges between the numbers of 1-10, where the lowest number represents a highest execution priority level. The TMD 322 also includes state that indicates whether a slot in the task table 345 in which the TMD 322 resides, after being scheduled by task management unit 300, is a valid slot—that is, where a deallocation of the TMD 322 has not been requested. The TMD 322 may also include state for SM affinity rules that specifies onto which SMs 310 in the PPU 202 the TMD 322 may be assigned, as described in detail below in conjunction with FIGS. 4A-4B. Each TMD 322 may also include state that indicates whether the TMD 322 may only execute when the task/work unit 207 is operating in a "throttle mode" that involves a single CTA having access to all of the shared memory accessible by the SMs 310 included in PPU 202. In one embodiment, a status of the throttle mode is stored in state 304 and updated by WDU 340 when WDU 340 switches between throttle and non-throttle modes. Each TMD 322 may also include state that specifies the TMD 322 is a sequential task and, therefore, may have at most one CTA "in flight" (i.e., being executed by an SM 310) at any given time.

At step 412, the WDU 340 determines whether any TMD 322 in the task table 345 indicates a throttle-mode property. If, at step 412, the WDU 340 determines that any TMD indicates a throttle-mode property, then method 400 proceeds to step 414 to determine whether a throttle-mode is activated within task/work unit 207. If, at step 414, WDU 340 determines that a throttle-mode is not activated within task/work unit 207, then the method 400 proceeds to step 450. As shown, at step 450 the WDU 340 waits until all outstanding TMDs 322 are executed, i.e., TMDs 322 that do not indicate a throttle-mode as activated. The method 400 then proceeds to step 452, where the WDU 340 sends throttle state to each of the SMs 310. In one embodiment, the throttle state for each SM 310 comprises both a value that indicates a size of a portion of shared memory that the SM 310 is able to access, along with a base address of where the portion of shared memory begins. Thus, the value that indicates the size of the portion of shared memory increases for each SM 310 when fewer SMs 310 are enabled. Conversely, the value that indicates the size of the portion of shared memory decreases for each SM 310 when more SMs 310 are enabled.

At step 454, the WDU 340 activates the throttle-mode, whereupon the method 400 proceeds back to step 402. The WDU 340 continues to operate in throttle-mode until the step 412 is false, i.e., until the WDU 340 determines that no TMDs 322 included in the task table 345 indicate a throttle-mode property. Accordingly, the WDU 340 deactivates the throttle mode at step 413, whereupon the method 400 resumes at step 416.

At step 416, the WDU 340 determines whether the current TMD is a sequential task. If, at step 416, the WDU 340 determines that the current TMD is a sequential task, then the method 400 proceeds to step 418, where the WDU 340 determines whether the current TMD has a CTA in flight, i.e., a CTA currently being executed by an SM 310. If, at step 418, the WDU 340 determines that the current TMD has a CTA in flight, then the method 400 proceeds to step 428 described above. Otherwise, the method 400 proceeds to step 420, described below.

Referring back now to step 416, if the WDU 340 determines that the current TMD is not a sequential task, then the method 400 proceeds to step 419. At step 419, the WDU 340 determines whether a launch quota of the current TMD 322, if any, is satisfied. In one embodiment, each TMD 322 includes both a launch quota enabled bit and a launch quota value. When the launch quota enabled bit is set to "true," the WDU 340 determines whether a number of CTAs equivalent to the launch quota value have been launched. Accordingly, if, at step 419, the WDU 340 determines that the launch quota of the TMD 322, if any, has been satisfied, then the method 400 proceeds to step 460.

At step 460, the WDU 340 parses the task table 345 and selects a TMD 322 that has a same priory level as the current TMD 322, whereupon the WDU 340 sets the selected TMD 322 as the current TMD 322. The method 400 then proceeds to step 402.

Referring back now to step 419, if the WDU 340 determines that the launch quota of the TMD 322 has not been satisfied, or that no launch quota is specified for the TMD 322, then the method proceeds to step 420.

At step 420, the WDU 340 determines whether affinity rules of the current TMD or throttle-mode parameters prohibit the current TMD from being assigned to the current SM. If, at step 420, the WDU 340 determines that affinity rules of the current TMD or throttle-mode parameters prohibit the current TMD from being assigned to the current SM, then the method 400 proceeds to step 428, described above. Otherwise, at step 424, the WDU 340 adds the current TMD to a task list that corresponds to the current SM.

At step 426, the WDU 340 determines whether additional TMDs 322 are included in the task table. If, at step 426, the WDU 340 determines that additional TMDs 322 are included in the task table 345, then the method 400 proceeds to step 428, described above. In this way, each TMD 322 included in the task table 345 is compared against the current SM to determine which TMD 322 is most-eligible to be assigned to the current SM, as described below in at step 434.

If, however, the WDU 340 at step 426 determines that additional TMDs 322 are not included in the task table 345, then all of the TMDs 322 have been compared against the current SM and, accordingly, the method 400 proceeds to step 430. At step 430, the WDU 340 executes a primary sort of the task list based the execution priority value associated with each TMD 322 included in the task list. At step 432, the WDU 340 executes a secondary sort of the task list based on a timestamp value associated with each TMD 322 included in the task list, where the timestamp value represents the time at which the TMD 322 was inserted into the task table 345. In one embodiment, the timestamp values are maintained in state 304, or may be included as a column within task table 345.

In some embodiments, the WDU 340, in lieu of timestamps, maintains a sorted list of the slots included in the task table 345, where entries in the list are inserted or deleted each time a new task is allocated or deallocated, respectively. Thus, the sorted list of slots remains organized and is only resorted each time a task is allocated or deleted, such that the oldest TMD 322 with the highest priority value can be readily identified and assigned to the current SM, as described below at step 434.

At step 434, the WDU 340 assigns, to the current SM, the TMD 322 with the highest priority value and the oldest timestamp value. In one embodiment, the current SM has associated therewith state that is set by WDU 340 and stored in SM state 342 when the TMD 322 is assigned to the current SM at step 434. Thereafter, WDU 340 modifies the state as CTAs corresponding to the TMD 322 that is assigned to the current SM are executed on the current SM, as described in detail below in conjunction with FIG. 5. In one embodiment, the state comprises several properties, including "TASK_ASSIGN," which indicates whether or not an eligible TMD is assigned to the current SM. The state may also include a "STATE_SYNC" property, which indicates whether the WDU 340 is waiting to issue a TMD 322 state update to the current SM, or the WDU 340 is waiting for an the current SM to acknowledge a state update, as described in further detail below at step 438. The state may also include a "CTA_LAUNCH" property, which indicates that the current SM is ready to receive and execute a CTA from the TMD 322 of step 434 (subject to the current SM having a capacity to accept and execute the CTA). Other state may be used to derive a CTA availability value, described below in conjunction with FIG. 5, for the current SM, which represents the number of additional CTAs WDU 340 could immediately launch to the current SM (i.e., before the WDU 340 receives any more CTA completion messages from the current SM).

At step 436, the WDU 340 determines whether a TMD 322 that is not the current TMD was previously assigned to the current SM. If, at step 436, the WDU 340 determines that a TMD 322 that is not the current TMD was previously assigned to the current SM, then the method 400 proceeds to step 438, where the WDU 340 sends state data associated with the current TMD to the current SM. Otherwise, the method 400 proceeds to step 440.

At step 440 the WDU 340 determines whether additional SMs 310 are included in the plurality of SMs 310. If, at step 440, the WDU 340 determines that additional SMs 310 are included in the plurality of SMs 310, then method 400 proceeds to step 442, where the WDU 340 sets a next SM 310 included in the plurality of SMs 310 as the current SM. However, if the WDU 340 at step 440 determines that no additional SMs are included in the plurality of SMs, then method 400 proceeds back to step 402, and the method 400 is repeated according to the techniques herein.

Thus, at the end of method 400, zero or more of the SMs 310 have assigned thereto a TMD 322 depending on, for example, the state data of the TMDs 322, if any, that are included in the task table 345. In conjunction with continually assigning different TMDs 322 to different SMs 310, the work distribution unit 340 is also configured to continually select an SM to which a CTA from a TMD 322 assigned to the one SM should be issued, which is described below in conjunction with FIG. 5.

Figure 5:
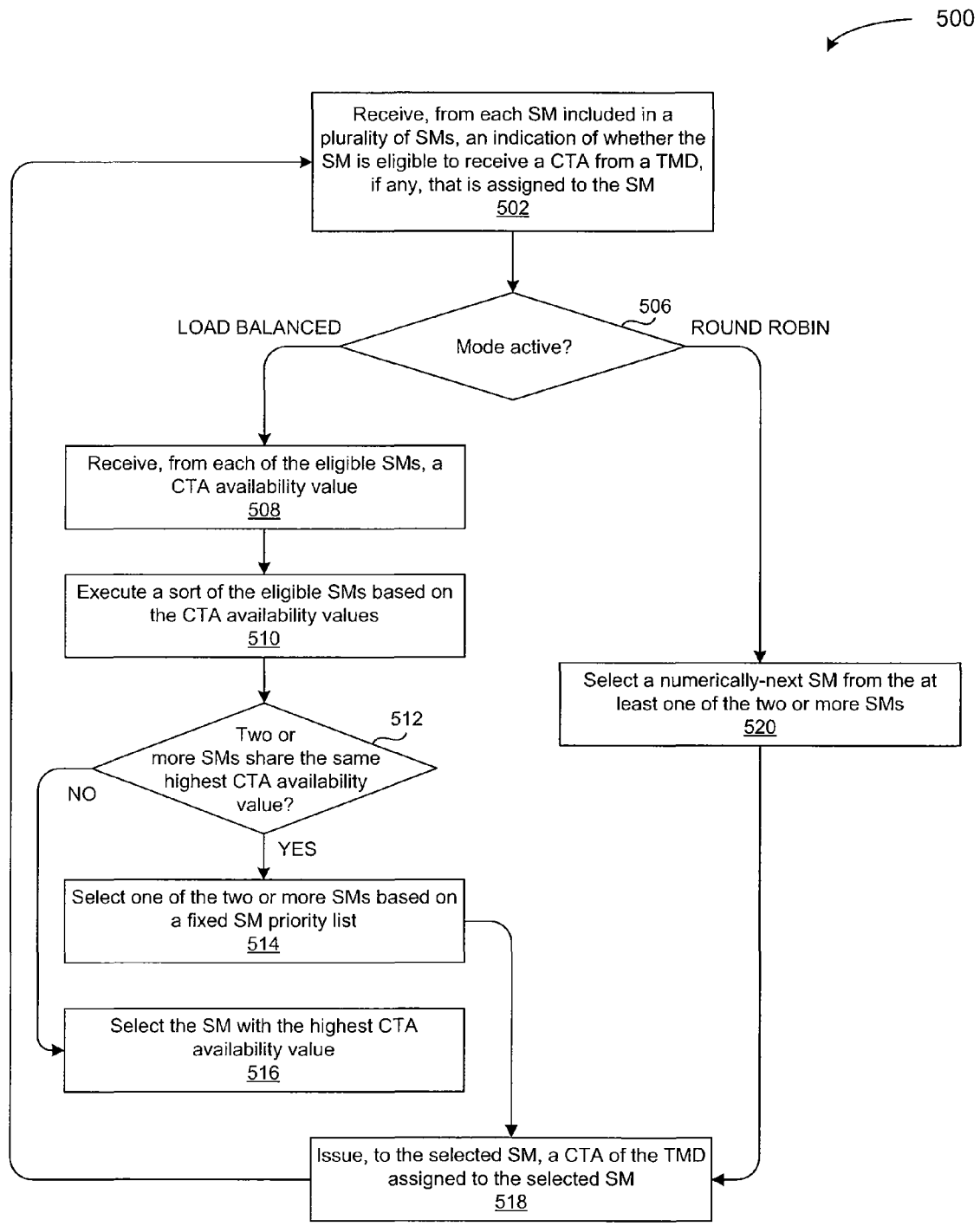
FIG. 5 illustrates a method for selecting an SM to receive work related to a task, according to one embodiment of the invention.

FIG. 5 illustrates a method 500 for selecting an SM 310 to receive work related to a task, according to one embodiment of the invention. Although the method steps are described in conjunction with the systems of FIGS. 1-3C, persons skilled in the art will understand that any system configured to perform the method steps, in any order, is within the scope of the inventions.

As shown, the method 500 begins at step 502, where the WDU 340 receives, from each SM 310 included in the PPU 202, an indication of whether the SM 310 is eligible to receive a CTA from a TMD 322, if any, associated with the SM 310. In one embodiment, the indication is transmitted in the form of a "ready" status derived from state associated with the SM 310 and stored in SM state 342 of FIG. 3A. In one example, the SM 310 is determined to be ready if the SM 310 has been assigned a TMD 322 (e.g., according to the method steps 400 described above in conjunction with FIGS. 4A-4B) and that the state associated with the TMD 322 has been sent to and acknowledged by the SM 310 (e.g., according to the method step 438 of the method 400). The SM 310 may also be determined as enabled or disabled based on whether the WDU 340 is operating in the throttle-mode described above in conjunction with FIGS. 4A-4B. TMD 322 assigned to the SM 310 requires the throttle mode described herein to be active and that the task/work unit 207 is, in fact, operating in the throttle mode. The SM 310 may further be determined as ready based on whether the TMD 322 assigned to the SM 310 satisfies any coalescing rules. For example, the TMD 322 assigned to the SM 310 may indicate that a minimum of eight outstanding work items must be included in, for example, a work item queue associated with the TMD 322 before a CTA is issued to the SM 310. Moreover, a coalescing timeout, as described above in conjunction with FIGS. 4A-4B, may be implemented in order to circumvent situations where the number of outstanding work items included in TMD 322 is greater than zero but never exceeds the threshold minimum number of outstanding work items per CTA. When the coalescing timeout occurs, the SM 310 becomes eligible to receive a CTA from the TMD 322, assuming the additional eligibility requirements described in conjunction with step 502 are met by the TMD 322 and/or SM 310.

At step 506, the WDU 340 determines whether a load balance mode or a round robin mode is active. In one embodiment, the active mode is managed by a single bit value stored in state 304 of task/work unit 207.

At step 508, the WDU 340 receives, from each of the eligible SMs 310, a CTA availability value. In one embodiment, the CTA availability value is a numerical value that indicates the overall capacity that the SM 310 has to accept and execute additional CTAs. This number is calculated by each SM 310 and is based on, for example, the current number of CTAs being executed by the SM 310, the per-CTA resource requirements of the task most recently assigned to the SM and the overall amount of free resources available to the SM 310, and the like.

At step 510, the WDU 340 executes a sort of the eligible SMs 310 based on the CTA availability values. At step 512, the WDU 340 determines whether two or more SMs 310 share the same highest CTA availability value. If, at step 512, the WDU 340 determines that two or more SMs 310 share the same highest CTA availability value, then the method 500 proceeds to step 514, where WDU 340 selects one of the two or more SMs 310 based on a fixed SM priority list. In one embodiment, the fixed SM priority list is included in state 304 of task/work unit 207.

Referring back now to step 512, if the WDU 340 determines that two or more SMs 310 do not share the same highest CTA availability value, then the method 500 proceeds to step 516, where the WDU 340 selects the SM 310 with the highest CTA availability value.

At step 518, the WDU 340 issues, to the selected SM 310, a CTA of the TMD 322 assigned to the selected SM 310. The method 500 then proceeds back to step 502, where the method steps 500 are repeated such that the WDU 340 continually issues CTAs to one or more SMs 310 as long as there is at least one TMD 322 assigned to the one or more SMs 310 and includes work that has not yet been executed by any SM 310.

Referring back now to step 506, if the WDU 340 determines that the active mode of task/work unit 207 indicates a round robin mode, then the method 500 proceeds to step 520. At step 520, the WDU 340 selects a numerically-next SM 310 from the eligible SMs 310 determined at step 502. In one embodiment, the WDU 340 maintains an identification value in state 304 of the last SM to which a CTA was issued. In this way, the WDU 340 may implement a round robin technique by continually issuing a CTA to the SM with a numerically-next SM identification value and updating the identification value in state 304 accordingly.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A computer-implemented method for assigning a compute task to a first processor included in a plurality of processors, the method comprising:
analyzing each compute task in a plurality of compute tasks to identify one or more compute tasks that are eligible for assignment to the first processor,
wherein the first processor comprises a single-instruction-multiple-data (SIMD) processor that includes multiple execution units, and a thread group having a plurality of threads executes across the multiple execution units to process different data via sets of substantially identical instructions, and wherein each compute task is listed in a first table and is associated with a priority value and an allocation order that indicates a time at which the compute task was added to the first table;

selecting a first compute task from the identified one or more compute tasks based on at least one of the priority value and the allocation order;

assigning the first compute task to the first processor for execution;

spawning one or more cooperative thread arrays (CTAs) that includes the thread group; and executing the one or more CTAs.

2. The computer-implemented method of claim 1, wherein the first compute task has a highest priority value.

3. The computer-implemented method of claim 2, wherein the first compute task and a second compute task have the same priority value but the allocation order of the first compute task comes before the allocation order of the second compute task.

4. The computer-implemented method of claim 1, wherein a compute task is identified as eligible when a deallocation request associated with the compute task has not been issued.

5. The computer-implemented method of claim 1, wherein a compute task is identified as eligible when the compute task includes work that has not yet been issued to any of the processors in the plurality of processors via a cooperative thread array (CTA).

6. The computer-implemented method of claim 1, wherein a compute task is identified as eligible when the compute task has to be processed in a throttle mode, and, wherein, in the throttle mode, the first processor is included in a restricted subset of the plurality of processors and each processor within the restricted subset is allowed to access a first portion of memory that is larger than a second portion of memory normally available to each processor in the plurality of processors when processing compute tasks in a non-throttle mode.

7. The computer-implemented method of claim 1, wherein a compute task is identified as eligible when the compute task requires that only one CTA may be executed at any given time and no CTAs associated with the compute task are currently being executed by any of the processors in the plurality of processors.

8. The computer-implemented method of claim 1, wherein a compute task is identified as eligible when affinity rules associated with the compute task do not prohibit any of the CTAs associated with the compute task from being executed by the first processor.

9. The computer-implemented method of claim 1, wherein a compute task is identified as eligible when a number of executed CTAs associated with the compute task has not reached a threshold value.

10. The computer-implemented method of claim 1, further comprising:

determining that the first processor was previously assigned to a compute task that was different than the first compute task; and sending state data associated with the eligible compute task to the first processor to allow the first processors to process the first compute task.

11. A non-transitory computer-readable storage medium storing instructions that, when executed by a processor, cause the processor to assigning a compute task to a first processor included in a plurality of processors, by performing the steps of:

analyzing each compute task in a plurality of compute tasks to identify one or more compute tasks that are eligible for assignment to the first processor, wherein the first processor comprises a single-instruction-multiple-data (SIMD) processor that includes multiple execution units, and a thread group having a plurality of threads executes across the multiple execution units to process different data via sets of substantially identical instructions, wherein each compute task is listed in a first table and is associated with a priority value and an allocation order that indicates a time at which the compute task was added to the first table;

selecting a first compute task from the identified one or more compute tasks based on at least one of the priority value and the allocation order;

assigning the first compute task to the first processor for execution;

spawning one or more cooperative thread arrays (CTAs) that includes the thread group; and executing the one or more CTAs.

12. The non-transitory computer-readable storage medium of claim 11, wherein the first compute task has a highest priority value.

13. The non-transitory computer-readable storage medium of claim 12, wherein the first compute task and a second compute task have the same priority value but the allocation order of the first compute task comes before the allocation order of the second compute task.

14. The non-transitory computer-readable storage medium of claim 11, wherein a compute task is identified as eligible when a deallocation request associated with the compute task has not been issued.

15. The non-transitory computer-readable storage medium of claim 11, wherein a compute task is identified as eligible when the compute task includes work that has not yet been issued to any of the processors in the plurality of processors via a cooperative thread array (CTA).

16. The non-transitory computer-readable storage medium of claim 11, wherein a compute task is identified as eligible when the compute task has to be processed in a throttle mode, and, wherein, in the throttle mode, the first processor is included in a restricted subset of the plurality of processors and each processor within the restricted subset is allowed to access a first portion of memory that is larger than a second portion of memory normally available to each processor in the plurality of processors when processing compute tasks in a non-throttle mode.

17. The non-transitory computer-readable storage medium of claim 11, wherein a compute task is identified as eligible when the compute task requires that only one CTA may be executed at any given time and no CTAs associated with the compute task are currently being executed by any of the processors in the plurality of processors.

18. The non-transitory computer-readable storage medium of claim 11, wherein a compute task is identified as eligible when affinity rules associated with the compute task do not prohibit any of the CTAs associated with the compute task from being executed by the first processor.

19. The non-transitory computer-readable storage medium of claim 11, wherein the compute task is identified as eligible when a number of executed CTAs associated with the compute task has not reached a threshold value.

20. The non-transitory computer-readable storage medium of claim 11, further comprising:

determining that the first processor was previously assigned to a compute task that was different than the first compute task; and sending state data associated with the eligible compute task to the first processor to allow the first processors to process the first compute task.

21. A system for assigning a compute task to a first processor included in a plurality of processors, the system comprising:

a memory that is configured to a plurality of compute tasks;
the plurality of processors; and
a scheduling unit that is configured to:
analyze each compute task in a plurality of compute tasks to identify one or more compute tasks that are eligible for assignment to the first processor, wherein the first processor comprises a single-instruction-multiple-data (SIMD) processor that includes multiple execution units, and a thread group having a plurality of threads executes across the multiple execution units to process different data via sets of substantially identical instructions, wherein each compute task is listed in a first table and is associated with a priority value and an allocation order that indicates a time at which the compute task was added to the first table;
select a first compute task from the identified one or more compute tasks based on at least one of the priority value and the allocation order; and
assign the first compute task to the first processor for execution,
wherein the plurality of processors are configured to execute one or more cooperative thread arrays (CTAs) that includes the thread group.

22. The computer-implemented method of claim 21, wherein:

selecting the first task from the identified one or more compute tasks further comprises selecting the first compute task based on one or more of:
first state that specifies a minimum number of work items to be included in each CTA,
second state that indicates whether a CTA is currently executing for the first compute task, and
third state that indicates a CTA availability value.

* * * * *